May 21, 1963 G. X. R. BOUSSU ETAL 3,090,190
ELASTIC CABLES
Filed Dec. 8, 1959 4 Sheets-Sheet 1
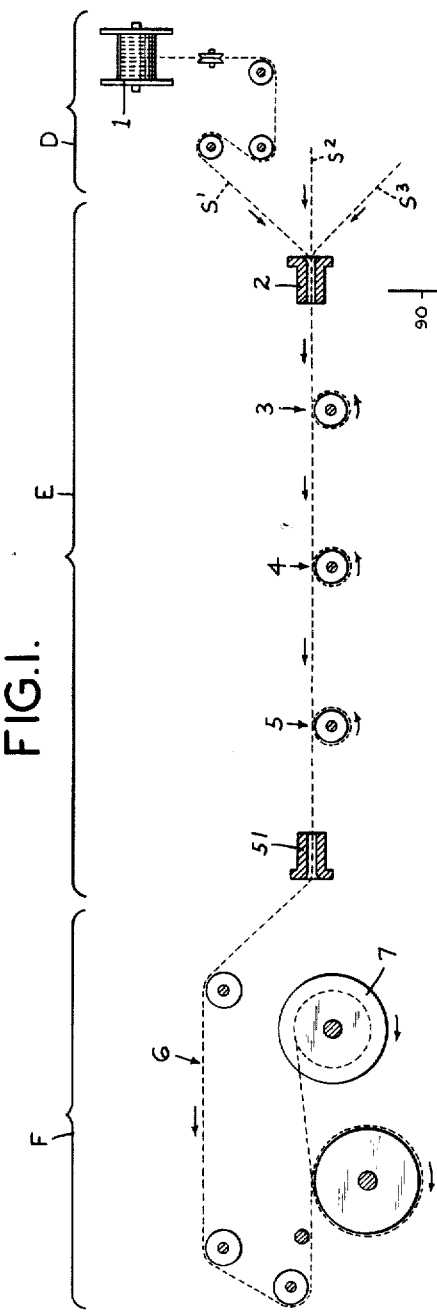
FIG.1.
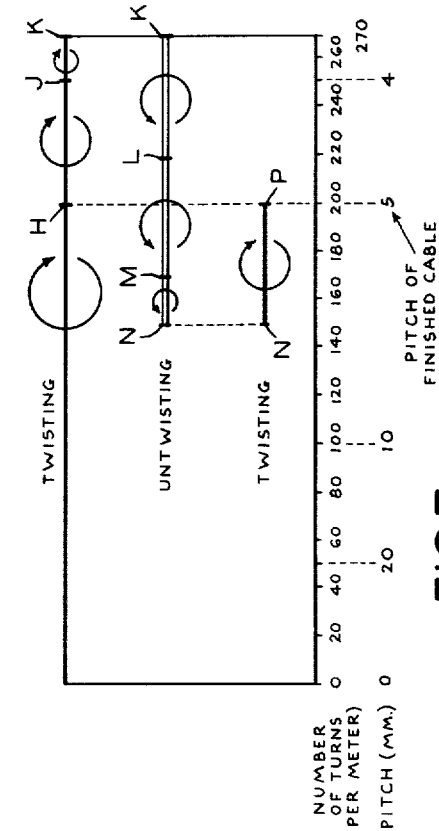
FIG.7.
FIG.8.
INVENTORS
GABRIEL XAVIER ROGER BOUSSU
LOUIS PIERRE FRANCOIS ANDRE NEUVILLE
LOUIS HENRI NOEL SAINT-FRISON
BY
Brumbaugh Free Graves & Donohue
THEIR ATTORNEYS

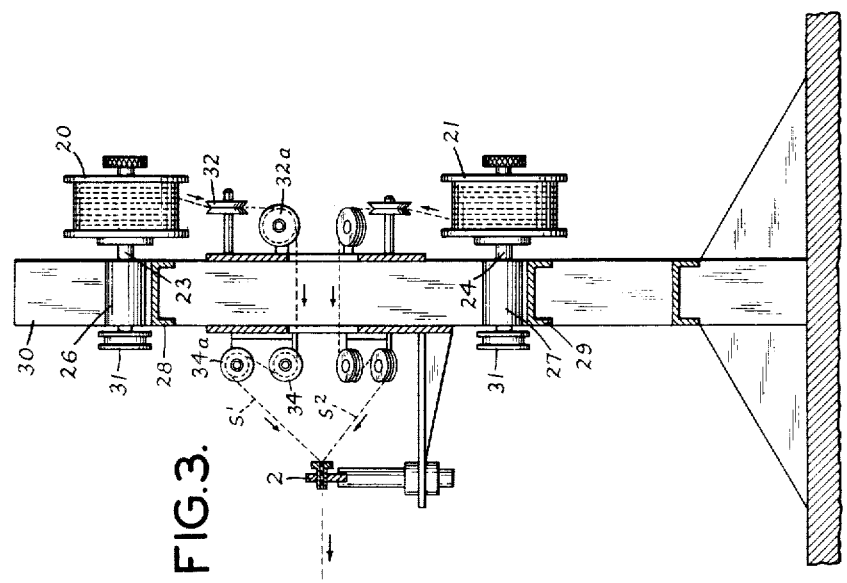
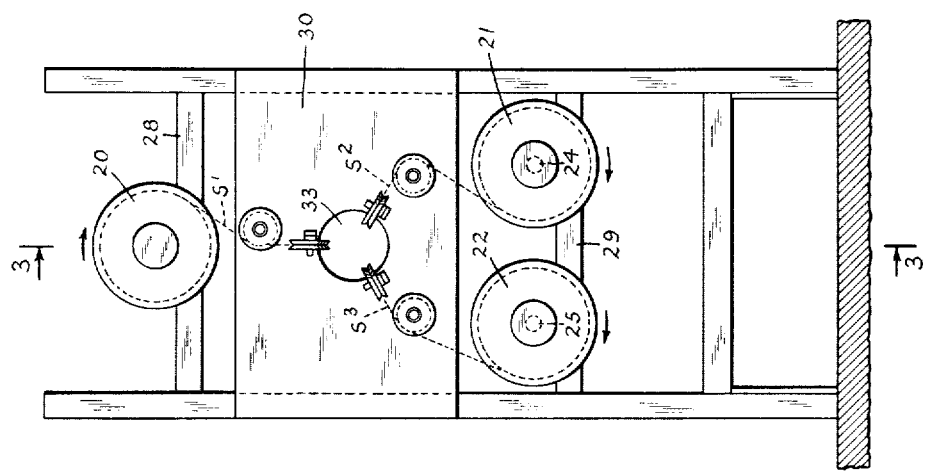

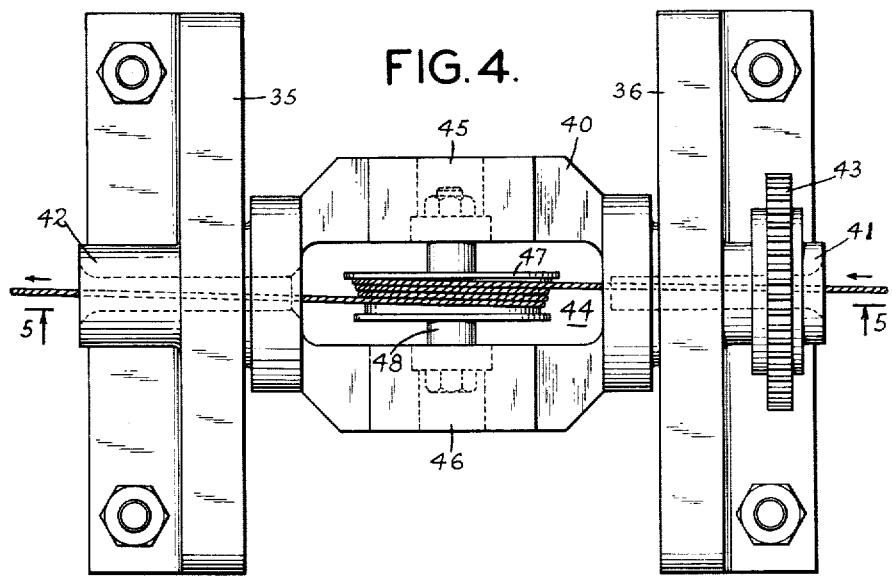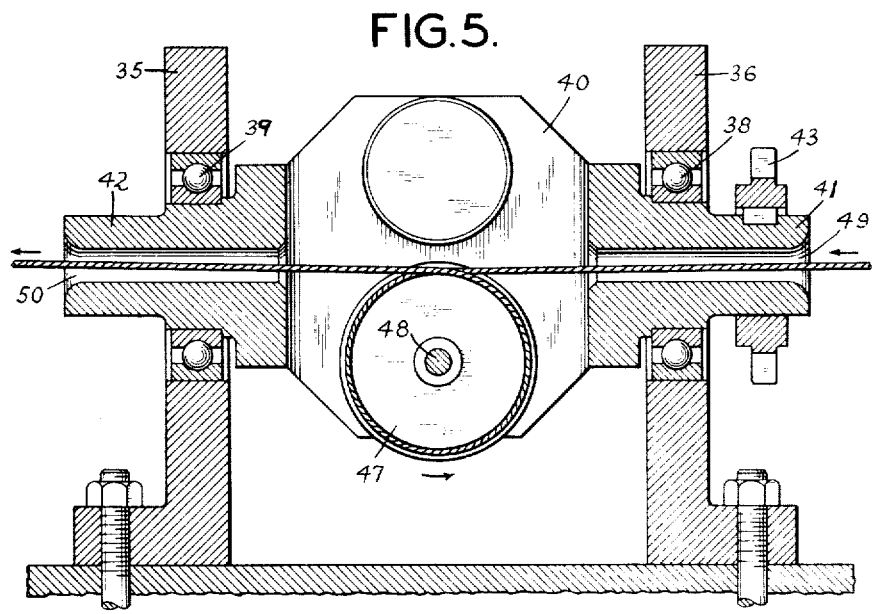

May 21, 1963
G. X. R. BOUSSU ETAL
3,090,190
ELASTIC CABLES
Filed Dec. 8, 1959
4 Sheets-Sheet 4
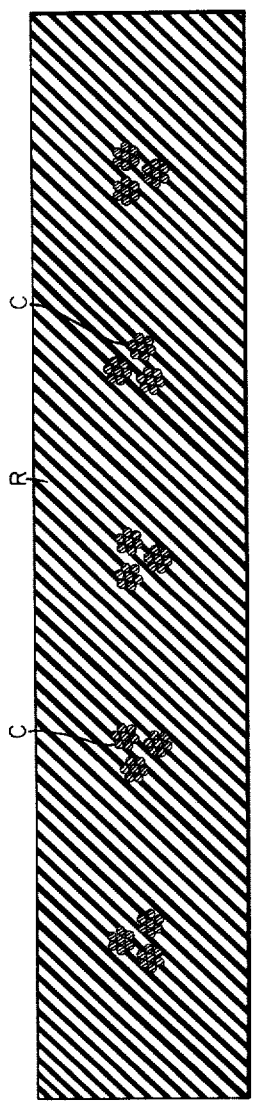
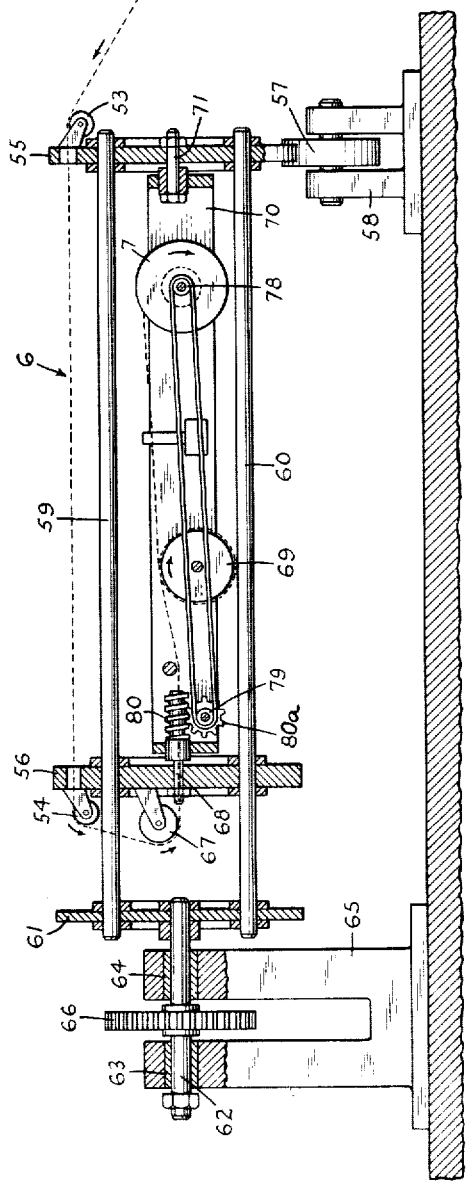
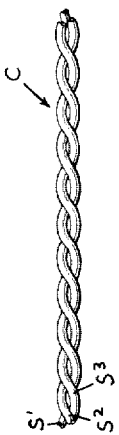
INVENTORS
GABRIEL XAVIER ROGER BOUSSU
LOUIS PIERRE FRANCOIS ANDRE NEUVILLE
LOUIS HENRI NOEL SAINT-FRISON
BY
THEIR ATTORNEYS

United States Patent Office 3,090,190
Patented May 21, 1963

3,090,190
ELASTIC CABLES
Gabriel Xavier Roger Boussu, Chamalieres, and Louis Pierre Francois Andre Neuville and Louis Henri Noel Saint Frison, Clermont-Ferrand, France, assignors to Michelin & Cie, Clermont-Ferrand, France
Filed Dec. 8, 1959, Ser. No. 858,252
Claims priority, application France Mar. 30, 1957
17 Claims. (Cl. 57—139)

This invention relates to improvements in metallic cables and it relates more particularly to the manufacture of elastic or extensible cables which are especially adapted for use in the reinforcement of tires or tire casings, transmssion and conveyor belts, and the like.

This is a continuation-in-part of U.S. application Serial No. 693,457, filed October 30, 1957.

Production of tires or tire casings containing metallic wire or metallic cable reinforcing elements in the sidewall and/or tread portions has become rather general because of advantages afforded by the use of such metallic cables instead of or in conjunction with the textile fabric cords or plies used heretofore in tires. Metallic cables impart much greater strength to the tires while at the same time enabling the number of plies therein to be materially reduced thereby increasing flexibility and durability of the tires. Moreover, cable-reinforced tires have increased resistance to damage by cutting or breaking of the plies or other causes. On the other hand, steel wires or cables used heretofore in the tires leave something to be desired because, in most instances, their elongation at rupture under tensile stress does not exceed two and one-half percent. Cables are known which have somewhat greater elongation, but they have not been used to any great extent in tire casings. The relatively inextensible cables do not transmit and distribute stress uniformly, or impart optimum flexibility to the plies of the tire. Stiff tires have uncomfortable riding properties and also are more susceptible to damage by sharp edged rocks and the like.

The present invention relates to flexible and extensible cables which are especially adapted for use in tires, tire casings, power transmission belts, conveyor belts and the like.

More particularly, the present invention relates to cables which are capable of being stretched substantially without rupturing under tension stresses. Steel cables according to the invention have considerably greater elasticity than the standard cables, their stretch at rupture point being at least 6% and as much as 12%. Because of their great elasticity, cables according to the invention also show improved characteristics in their resistance to shock and cutting.

The method of making steel cables according to the invention utilizes a principle long known in cable manufacture according to which a metal wire of a certain diameter after having been subjected to twisting about its longitudinal axis, returns a constant maximum number of twists when it is released. This number is a function of the wire's diameter. Thus, a steel wire of 0.15 mm. diameter will untwist through its elasticity a maximum of 50 twists while an 0.20 mm. diameter wire will untwist 28 twists. If, then, an 0.15 mm. diameter steel wire has been subjected to less than 50 twists, it will untwist completely and recover its initial state. On the other hand, if it undergoes a number of twists exceeding 50, it will untwist only 50 twists and will permanently retain all the twists in excess of 50. This principle applies to a single wire and also to an assembly of wires for forming a strand or a cable and to both possible directions of torsion. In the rest of this description and also in the claims, this maximum value for elasticity return will be indicated by the expression "limit of torsional elasticity."

One of the purposes of the invention is to manufacture by applying the above principle, cables having great elasticity and being at the same time non-untwisting (not tending to untwist spontaneously). It will be noted that a non-untwisting cable has the advantage of not separating in its component elements by spontaneous untwisting when it is cut at any point.

Another purpose of the invention is to manufacture, still applying the same principle, cables having great elasticity which are non-untwisting and neutral. It will be noted that a neutral cable is one which does not form a curl (kink) when not under tension.

The method of manufacture of cables according to the invention is carried out as follows:

1. The elements designed to constitute the cable are twisted together by giving these elements a number of twists corresponding to the pitch desired in the final product;

2. Extra twists are given equal to the sum represented by:
   (a) The limit of torsional elasticity; and
   (b) A number of additional twists which will vary according to the degree of elasticity desired in the finished cable;

3. The assembly thus obtained is untwisted by a number of turns equal to the limit of torsional elasticity;

4. Further untwisting is effected for a number of turns equal to the sum represented by:
   (a) The limit of torsional elasticity;
   (b) Extra untwisting by a number of turns equal to the number of additional twists applied as indicated under 2(b);

5. The cable is allowed to restore elastically the untwisting turns to which it was subjected as explained under 4(a). The cable retains the number of additional untwisting turns applied according to 4(b).

The elements constituting the finished cable thus obtained are not tightly pressed together because they have been subjected as indicated under 2(b) and 4(b) to a twisting followed by untwisting beyond the limit of torsional elasticity. The longitudinal elasticity of the cable is a term of the twisting and untwisting operations effected beyond the limit of torsional elasticity. The greater the number of turns twisted and untwisted beyond this limit, the greater the longitudinal elasticity of the finished cable.

The amount of extra untwisting indicated under 4(b) above need not be identical with that of overtwisting mentioned under 2(b), since with unequal amounts of overtwisting and over-untwisting an elastic, non-untwisting and neutral cable would also be obtained, but with a pitch different from that referred to under step one; the difference of pitch would be equal to the difference between the number of twists and untwists given during steps 2(b) and 4(b).

The cable thus obtained is non-untwisting and neutral because care has been taken both after the twisting and untwisting operations to permit restoring of the twists or untwisting turns effected up to the limit of torsional elasticity as indicated under 2(a) and 4(a).

The high elasticity of the cables according to the invention is not exclusively a function of the amount of play between their individual components but chiefly is the result of the twisting and untwisting operations carried out beyond the limit of torsional elasticity. The result of such treatment is that the components of the finished cable act as completely balanced springs, i.e. are entirely free from internal stresses and do not interfere with one another, so that they can readily stretch elastically.

The modulus of elasticity and tensile strength of the new cables can be regulated by proper selection of the wires forming the cables and their elasticity or stretchability otherwise modified by the manner or extent of twisting during formation so that they can be made to withstand widely varying service conditions.

Inasmuch as the strands of the cables are relatively loosely associated, the rubber of tire plies can penetrate into the cables and form a strong mechanical bond to the cables. Moreover, the elasticity of the new cables renders them considerably more resistant to cutting than non-elastic cables having the same cross-section and made up of the same number of wires of the same physical characteristics so that they are particularly satisfactory for use in connection with the triangulated reinforcement of the tread zone and the flexible sidewalls of tire casings of the type shown in the Bourdon Patent No. 2,493,614, or the Bourdon Patent No. 2,811,998, as well as in other types of tires or tire casings.

Power transmitting belts, conveyors or the like containing the new cables can be made flatter, can be molded more readily and the inherent resiliency or extensibility of the cable affords a more uniform distribution of stresses throughout the belts.

For a better understanding of the present invention, reference may be had to the accompanying drawings in which:

FIGURE 1 is a schematic illustration of an apparatus suitable for manufacturing cables of the type embodying the present invention;

FIGURE 2 is an end elevational view of an apparatus for supplying wires or strands to the twisting apparatus;

FIGURE 3 is a view in section taken on line 3—3 of FIGURE 2;

FIGURE 4 is a plan view of a mechanism for twisting a cable;

FIGURE 5 is a view in section taken on line 5—5 of FIGURE 4;

FIGURE 6 is a view partially in longitudinal section and partially in side elevation of a reeling and twisting mechanism forming a part of the cable-making machine;

FIGURE 7 is a diagrammatic illustration of the different stages of manufacture of cables embodying the invention;

FIGURE 8 is a graph showing the tension curves of an elastic cable embodying the invention and of a non-elastic cable composed of the same number of wires of the same diameters;

FIGURE 9 is a side view of a cable embodying the invention; and

FIGURE 10 is a view in cross-section of a coreless cable embodying the invention embedded in a layer of rubber.

A suitable type of apparatus for making a cable embodying the present invention is illustrated diagrammatically in FIGURE 1 of the drawing. As shown therein, D is a strand feeding mechanism in which a plurality of metallic strands formed of one or more metallic filaments or wires are supplied from a plurality of reels 1 and so forth, over a pulley system to a bushing or guide 2 where the strands S1, S2, S3 and so forth, are brought into side-by-side relation and fed to a series of twisting capstans 3, 4 and 5 in the twisting section E of the apparatus where the strands are twisted by capstan 3, further twisted by the capstan 4 and then partially untwisted by the twisting capstan 5. The partially untwisted and thus somewhat loosened and elastic cable C issuing from the last twisting section 5 then passes into Section F of the machine which includes rotating-receiving device 6 receiving the cable C, leaving the twister 5 and winding it on a receiving spool 7.

In the operation of the device, the first twister 3 turns in one direction to give the assembly of strands S1, S2, S3 a twisting pitch equal to between 20 and 100 times the diameter of the wire making up the strands and usually from 30 to 50 times the diameter of the wire. After twisting in the twister 3, the cable passes to the twister 4 which turns in the same direction as the twister 3 but at a higher speed where the cable is given an additional twist. The cable then passes to the twister 5 which turns at a lower rate than the twister 4 and in the same direction so that the wire is partially untwisted when moving from the twister 4 to the twister 5 and sufficient play is introduced between the strands to impart the desired elasticity or stretch to the cable. The amount of play should be between about ¼ and ½₀ of the diameter of the individual strands making up the finished cable.

FIGURES 2 to 6 illustrate in greater detail the structure of the various elements of the cable-forming machine. As shown in FIGURES 2 and 3, the feeding section D for the strands S1, S2 and S3 includes a series of spools or reels 20, 21 and 22 on which are wound the strands made up of one or more wires to be formed into the cable. Moreover, more than the three strands S1, S2 and S3 shown may be supplied by the supply device as may be required. Thus, four, five or more spools may be mounted in such a manner as to supply the various strands to the bushing or guide 2 of the apparatus. It will be seen from FIGURE 3 that the spools 20, 21 and 22 are mounted on shafts 23, 24, 25 which are rotatably mounted in suitable bushings or bearings 26, 27 fixed to cross-pieces 28, 29 on a supporting frame 30. Each of the shafts 23, 24, 25 has a friction brake 31 thereon to adjust the tension on the strands. The strands are drawn off of each reel over similar systems of pulleys including pulleys 32, 32a which direct the strand through an opening 33 in the frame 30 and thence over the pulleys 34 and 34a which direct the strands inwardly at an angle into the bushing 2 in side-by-side relation. Assembled strands S1, S2, S3 leaving the bushing 2 pass through the several twisting devices 3, 4 and 5 all of which are the same as the twister disclosed in FIGURES 4 and 5 of the drawing. A suitable type of twister may include a pair of frame members or uprights 35 and 36 having bearings 38 and 39 therein for receiving rotatably the twister frame 40. As best shown in FIGURE 5, the twister frame 40 has hollow shafts 41 and 42 at its opposite ends journaled in the bearings to enable the frame to be rotated about the axis of the shafts. A sprocket 43 is mounted on the shaft 41 for rotating the frame 40. Mounted in a slot 44 in the mid-portion of the twister frame 40 and between the side plates 45 and 46 of the twister frame is a capstan 47 which is supported for rotation on a shaft 48 which is mounted in suitable bearings in the side plates 45 and 46 of the frame. As shown in FIGURE 5, the partially twisted or assembly of strands is passed through the opening 49 in the shaft 41, is wrapped several times around the capstan 47 and then is passed out through the opening 50 in the shaft 42. Upon rotation of the capstan frame 40 by means of the sprocket 43, a predetermined number of turns can be inserted in the cable between the twister 3 and the bushing or guide 2.

The twisters 4 and 5 are like the twister shown in FIGURES 4 and 5 and they impart a desired twist to the cable during its formation. An additional number of turns or twists are introduced at the twister 4 while twister 5 partially untwists the strands S1, S2 and S3.

The cable C issuing from the twister 5 passes through another guide member 51 into the receiving section F of the twisting machine which is disclosed in greater detail in FIGURE 6 of the drawing. Thus, the cable passes successively over guide rollers 53 and 54 mounted on frame or end plates 55 and 56 of a twisting and reeling frame. The end plate 55 is disc-like and its periphery engages a pair of idler rollers 57 mounted on frame member 58. The end plates 55 and 56 are connected by means of two pairs of rods 59, 60, thereby forming a generally cage-like frame which can be rotated bodily. A plate 61 connected to the left-hand ends of the rods 59 and 60 has a shaft 62 thereon which extends through suitable bushings 63, 64 in the standard 65 and is rotatable relative thereto. A sprocket 66 fixed to the shaft 62 is driven by a chain or other mechanism to rotate the frame to twist, untwist or hold the cable C more or less static with respect to the twister 5. After passing over the roller 54, the cable C passes around another pulley or guide roller 67 and is fed axially through a tube 68 mounted in the mid-portion of the end plate 56 and around a capstan 69 which is journaled in a subframe 70 which is mounted for rotation on the tube 68 and a shaft 71 fixed to the end plate 55. The subframe 70 is counterbalanced to hold it level and against rotation with the end plates 55 and 56. After passing around the capstan 69, the cable is wound up on the receiving reel 7 which is journaled in the subframe 70 and is driven by means of a chain or belt which passes around a sprocket 78 fixed to the reel and a sprocket 79 which is driven by means of a worm and worm gear drive 80 and 80a. The worm 80 is fixed to and rotates with end plate 56 while the worm gear 80a is rotatably mounted in the frame 70. Other suitable drive mechanism for the take-up reel 7 may be provided to enable an appropriate tension to be applied to the cables thereby to tension the strands properly and assure twisting of them. The operation of the various components of the cable-making machine is controlled to impart the desired characteristics to the cable made therein.

In order to make an elastic cable C (FIGS. 9 and 10) composed of three strands S1, S2 and S3 (FIGURE 3) each containing seven metal wires 0.15 mm. in diameter with a pitch of 5 mm. per meter (=200 twists per meter) the three strands are conveyed side by side from three spools 20, 21 and 22 through a guide 2 (FIGURES 1 and 3) and are twisted together by the twisting device 3 (FIGURES 1, 4 and 5) which gives them the pitch desired in the completed cable (stage H, FIGURE 7). On leaving the twisting device 3, the strands have received 200 twists and thus have the pitch of 5 mm. desired in the finished cable. But the assembly thus obtained is not neutral and has the tendency to untwist because it has not untwisted the number of twists corresponding to the limit of torsional elasticity. It is not elastic because the elements composing it are packed very tightly together.

The assembly then passes on to the second twisting device 4 which twists it further by a number of twists equal to the sum represented by the limit of torsional elasticity, that is to say, 50, in the example chosen (stage J, FIGURE 7) and by a number of additional twists which varies according to the longitudinal elasticity desired in the finished cable; in the case of this example, the number is 20. The cable, on leaving twister 4, has thus reached the stage indicated by K in FIGURE 7 and has received a total of 200+50+20=270 twists. It is neither neutral nor non-twisting since it has not yet returned the number of twists corresponding to the limit of torsional elasticity. It has no elasticity because the elements composing it are very tightly packed together.

The cable then passes on to the third twisting device 5 which turns in the same direction but less rapidly than the first two. The difference in speed results in the partial untwisting of the cable. This untwisting should be calculated so as to equal the sum represented by:

(a) the limit of torsional elasticity, that is to say, 50 in the example chosen (stage L, FIGURE 7); and (b) a number of extra untwisting turns equal to the torsional elastic limit which is again 50 (stage M, FIGURE 7) plus an additional number of further untwisting turns corresponding to the elasticity desired in the finished cable, that is to say, 20 in the example chosen (stage N, FIGURE 7). These additional further untwisting turns will remain in the completed cable because the cable, after leaving twister 5 will only return the number of extra untwistings equal to the torsional elasticity limit, that is to say, 50, in the example chosen.

On leaving twister 5, that is to say, in stage N, the assembly then has only 270−50−50−20=150 twists per meter, that is, 50 twists less than the number of twists desired in the finished cable. It is elastic because its constituting elements were separated one from the other by the untwisting but it is not neutral because it has not yet restored the number of extra untwisting turns equal to the limit of torsional elasticity which were applied to it as indicated under (b) above.

This restoration of these extra untwisting turns can be effected, for example, in the cable-receiving equipment 6. The cable leaving guide 51 moves over the pulleys 53, 54, 67, capstan 69 and is wound on the spool 7. The guide 51, pulley 67 and capstan 69 are on a substantially straight line which constitutes the axis of rotation of the rotating frame. While the cable follows its travel path, it rotates about the above-mentioned axis of rotation. To obtain a neutral cable with the qualities of elasticity and the non-untwisting property desired, it is sufficient to regulate the rotational speed of the assembly turning in such a way as to restore the extra untwisting turns of the cable leaving guide 51. The cable C wound around the spool 7 has thus reached stage P of FIGURE 7. It has 200 twists per meter, that is to say, the 5 mm. pitch desired. It is elastic because it has retained 20 untwisting turns to the meter which has caused a uniformly distributed play or spacing between its strands S1, S2, S3, as illustrated in FIGURE 9.

It is understood, of course, that the longitudinal elasticity of the cables fabricated according to this method can be proportioned since this elasticity is a term of the number of twists and "untwists" effected beyond the limit of torsional elasticity.

As a result of play or spacing between the strands of the cables, they have very slight internal friction and damping effect.

FIGURE 8 discloses the characteristics of cables of a type embodying the present invention as compared with relatively non-elastic or non-stretchable cables made of a similar type, number and arrangement of wires. FIGURE 8 shows at 81 the elongation curve of a three-strand elastic cable embodying the present invention in which each strand contains seven steel wires each having a diameter of 0.15 millimeter.

FIGURE 8 also shows at 82, the elongation curve of the non-elastic cable also formed of three strands, each containing seven steel wires having a diameter of 0.15 mm.

A table below gives the percentage of elastic elongation figures of the above-mentioned cables in the range of 2.5 to 50 kg. and the elongation at rupture as also disclosed in FIGURE 8.

TABLE I

| | Elastic Cable, percent | Non-Elastic Cable, percent |
|---|---|---|
| Elongation under load of 2.5 kgs. | 3.4 | 0.22 |
| Elongation under load of 5 kgs. | 5.3 | 0.40 |
| Elongation under load of 10 kgs. | 6.3 | 0.75 |
| Elongation under load of 30 kgs. | 8.5 | 1.50 |
| Elongation under load of 50 kgs. | 9.1 | 2.50 |
| Elongation at rupture | 11.5 | 5.85 |

The right-hand column of Table I and the curve 82 of FIGURE 8 show that a non-elastic cable, not embodying the invention, has a maximum elongation at rupture of less than 6% and thus less than the minimum elongation of cables embodying the present invention. The differences between the new cables and the comparison cables (curve 82, FIGURE 8) and the prior cables are even more apparent in the range of tensile stresses to which the cables are subjected in normal use. The load on cables used in tires and belts usually does not exceed about ⅓ the load required to rupture the cable. Referring to FIGURE 8, it will be apparent that in the range of 20 to 30 kg. (approximately ⅓ the rupture stress), the elongation of the non-elastic cable (curve 82) is between about ⅛ and ⅕ the elongation of the elastic cable represented by the curve 81.

Elastic cables embodying the invention which have a maximum elongation of 6% or slightly more at rupture, have the following percentage elongation in the normal operating range:

TABLE II 2.6% at a load corresponding to 5% of the load at rupture
3.6% at a load corresponding to 10% of the load at rupture
4.6% at a load corresponding to 20% of the load at rupture
5.0% at a load corresponding to 30% of the load at rupture Table II shows that elongation of the least elastic of the new cables in the range of stresses normally encountered in use is three to four times as great as the elongation of the most elastic of the prior cables, subjected to the same tensile stresses represented by curve 82.

From the preceding tables, it will be clear that the new cables have between about 5.0% and 8.2% elongation at about 30% of the rupture stress of the cables.

Two cables, one embodying the invention and containing seven strands of three wires each and the other being non-elastic and containing three strands of seven wires each, the wires in each case being 0.23 mm. in diameter, were cut by means of a cutting tool to which a static load was applied. A force of at least 155 kg. was required to cut the new elastic cable, while a force of 50 kg. was sufficient to cut the non-elastic cable. Thus, the new cable is at least three times as resistant to cutting as prior cables.

Under the effect of repeated shocks (Charpy pendulum), the elastic cable resists at least 136 shocks, while only 31 are enough to rupture the non-elastic cable.

Fatigue tests showed that an elastic cable made according to the invention did not have a single broken wire after having undergone 200,000 bends, while a non-elastic cable had 25% of its wires broken after 100,000 bends.

It will be understood that elastic strands or cables may be made having any number of wires or strands, for example, strands or cables composed of from 3 to 18 wires or of 3 strands with 7 wires each, of 4 strands with 4 wires each, or of 12 strands with 7 wires each, etc. The cables are preferably manufactured without core so that the rubber R (FIG. 10) in which they are embedded, for example, in a tire casing, a belt, or the like, may better penetrate the center of the cables, thus insuring better anchoring. However, a flexible core of natural, artificial or synthetic textile material may be included in the cable as it does not appreciably affect the elasticity of the cable. It is even possible to make elastic cables according to the invention by making the cable around a temporary core which is withdrawn after the cable is completed, as described, more particularly, in application Serial No. 693,457.

It will be appreciated that by varying the twisting and untwisting of the wires or strands beyond the limit of torsional elasticity, it is possible to vary the elasticity or stretchability of the cable and thereby to produce cables which are suitable for many different purposes.

From the preceding description of typical methods and apparatus for producing the new elastic or extensible cables and from the typical examples of such cables given herein, it will be understood that the cables are susceptible to considerable variation in the arrangement of the strands or wires therein and in their characteristics such as diameter and composition of the wires and the formation and structure of the cores of the cables, when present. Moreover, the apparatus for forming the cables is susceptible to considerable modification and, accordingly, the forms of the invention described herein should be considered as illustrative and not as limiting the scope of the following claims.

We claim:
1. A cable comprising a plurality of helically twisted strands of wire, each of said strands being formed of a plurality of individually twisted wires twisted around each other and having a permanent set retaining said strand in its helical shape, and said strands being loosely associated to enable said strands to move toward and away from each other when subjected to tension lengthwise thereof.

2. A cable comprising a plurality of strands, each formed of a plurality of twisted metallic wires, said strands each being bent into a helix and being permanently set, said strands being loosely assembled in twisted relation with capacity for limited relative movement inwardly and outwardly to enable the assembled strands to stretch at least 6% at the rupture point.

3. The cable set forth in claim 2 in which the wires and strands are twisted at a pitch between about 20 and 100 times the diameter of said wires.

4. The cable set forth in claim 3 in which the capacity for relative movement of the strands is between about one-fourth and one-twentieth of the diameter of said wires.

5. An elastic cable comprising a plurality of normally helical strands containing at least one twisted metallic wire, said strands being twisted together with their convolutions wound around each other in substantially coaxial relation and with freedom of relative movement therebetween sufficient to enable said cable to be stretched at least 6%.

6. An elastic cable comprising a plurality of individually twisted strands twisted around each other, each strand containing at least one metallic wire and being normally helical in form when relieved of external stress, said helical strands being loosely associated and movable relative to each other to enable said cable to be stretched between about 5% and 8.2% by stresses approximating 30% of the rupture stress of the cable.

7. The elastic cable set forth in claim 6 in which each strand comprises a plurality of metallic wires.

8. An article of manufacture comprising a layer of rubbery material containing and adhered to at least one metallic cable of the type set forth in claim 6.

9. The cable set forth in claim 7 in which the capacity for relative movement of the strands is between about one-fourth and one-twentieth of the diameter of said wires.

10. An article of manufacture comprising a layer of an elastomer containing and bonded to a plurality of cables of the type set forth in claim 6.

11. An article of manufacture comprising a layer of an elastomer containing and bonded to a plurality of cables of the type set forth in claim 7.

12. An elastic cable comprising a plurality of strands containing at least one twisted metallic wire, and said strands being twisted around each other in loose unstressed relation, each strand being helical in shape when relieved of stress and having its convolutions substantially coaxial with the convolutions of the other strands, said loose unstressed relation of said strands enabling said cable to be stretched at least 6% and rendering said cable highly flexible and resistant to breaking by bending.

13. An article of manufacture comprising a layer of an elastomer containing and bonded to a plurality of cables of the type set forth in claim 12.

14. An elastic cable comprising a plurality of strands twisted around each other, each strand containing a plurality of metallic wires and being normally helical in form when relieved of external stress, said helical strands being loosely associated and movable relative to each other to enable said cable to be stretched between about 5% and 8.2% by stresses approximating 30% of the rupture stress of the cable.

15. An elastic cable comprising a plurality of individually twisted strands twisted around each other, each strand containing a plurality of metallic wires and being normally helical in form when relieved of external stress, said helical strands being loosely associated and movable relative to each other to enable said cable to be stretched between about 5% and 8.2% by stresses approximating 30% of the rupture stress of the cable.

16. An elastic cable comprising a plurality of strands twisted around each other, each strand containing a plurality of individually twisted metallic wires twisted around each other, each strand being normally helical in form when relieved of external stress, said helical strands being loosely associated and movable relative to each other to enable said cable to be stretched between about 5% and 8.2% by stresses approximating 30% of the rupture stress of the cable.

17. An elastic cable comprising a plurality of individually twisted strands twisted around each other, each strand containing a plurality of individually twisted metallic wires twisted around each other, each strand being normally helical in form when relieved of external stress, said helical strands being loosely associated and movable relative to each other to enable said cable to be stretched between about 5% and 8.2% by stresses approximating 30% of the rupture stress of the cable.

References Cited in the file of this patent

UNITED STATES PATENTS

| | | |
|---|---|---|
| 1,615,790 | Forbes | Jan. 25, 1925 |
| 1,695,595 | Larned | Dec. 18, 1928 |
| 1,700,170 | Larned | Jan. 29, 1929 |
| 1,739,481 | Cook et al. | Dec. 10, 1929 |
| 1,979,013 | Rohs | Oct. 30, 1934 |
| 2,055,948 | Selquist | Sept. 29, 1936 |
| 2,073,821 | Yaxley | Mar. 16, 1937 |
| 2,202,844 | Edwards | June 4, 1940 |
| 2,457,631 | Bennett | Dec. 28, 1948 |
| 2,598,033 | Bourdon | May 27, 1952 |

FOREIGN PATENTS

| | | |
|---|---|---|
| 208,207 | Great Britain | Dec. 10, 1923 |
| 485,147 | Great Britain | May 16, 1938 |

UNITED STATES PATENT OFFICE
CERTIFICATE OF CORRECTION

Patent No. 3,090,190　　　　　　　　　　　　　　　　May 21, 1963

Gabriel Xavier Roger Boussu et al.

It is hereby certified that error appears in the above numbered patent requiring correction and that the said Letters Patent should read as corrected below.

In the grant, line 3, and in the heading to the printed specification, line 5, for "Saint Frison", each occurrence, read -- Saint-Frison --; column 5, line 56, for "non-twisting" read -- non-untwisting --.

Signed and sealed this 3rd day of December 1963.

(SEAL)
Attest:

ERNEST W. SWIDER　　　　　　　　　　　　　　　　EDWIN L. REYNOLDS
Attesting Officer　　　　　　　　　　　　　　　　Acting Commissioner of Patents